United States Patent
Metel et al.

(10) Patent No.: US 11,297,071 B2
(45) Date of Patent: Apr. 5, 2022

(54) TIME-STAMPING FOR INDUSTRIAL UNIDIRECTIONAL COMMUNICATION DEVICE WITH DATA INTEGRITY MANAGEMENT

(71) Applicant: Siemens Mobility GmbH, Munich (DE)

(72) Inventors: Omer Metel, Anchorage, KY (US); Leandro Pfleger de Aguiar, Robbinsville, NJ (US); David Hingos, East Brunswick, NJ (US); Safia Rahmat, Plainsboro, NJ (US)

(73) Assignee: Siemens Mobility GmbH, Munich (DE)

( * ) Notice: Subject to any disclaimer, the term of this patent is extended or adjusted under 35 U.S.C. 154(b) by 122 days.

(21) Appl. No.: 16/872,680

(22) Filed: May 12, 2020

(65) Prior Publication Data

US 2021/0360002 A1 Nov. 18, 2021

(51) Int. Cl.
*H04L 29/06* (2006.01)
*G06F 21/64* (2013.01)

(52) U.S. Cl.
CPC ............ *H04L 63/123* (2013.01); *G06F 21/64* (2013.01); *H04L 63/0428* (2013.01)

(58) Field of Classification Search
CPC .... H04L 63/123; H04L 63/0428; G06F 21/64
See application file for complete search history.

(56) References Cited

U.S. PATENT DOCUMENTS

| 10,027,699 | B2 | 7/2018 | Wei et al. |
| 10,250,619 | B1* | 4/2019 | Park ...................... H04L 63/18 |
| 2005/0005031 | A1* | 1/2005 | Gordy ................ H04L 63/1408 709/250 |
| 2011/0059696 | A1* | 3/2011 | Rasmussen .......... H04R 25/552 455/41.1 |
| 2013/0117556 | A1 | 5/2013 | Coleman et al. |
| 2016/0073263 | A1* | 3/2016 | Wolosewicz .......... H04L 63/123 726/4 |
| 2016/0112384 | A1* | 4/2016 | Frenkel ............... H04L 63/0876 713/155 |
| 2018/0375876 | A1 | 12/2018 | Blocher et al. |
| 2020/0259585 | A1* | 8/2020 | Aust ..................... H04L 1/1848 |

FOREIGN PATENT DOCUMENTS

WO 2020061388 A1 3/2020

OTHER PUBLICATIONS

C. Adams et al.; IETF RFC 3161, "Internet X.509 Public Key Infrastructure—Time-Stamp Protocol (TSP)", Network Working Group; Aug. 2001, https://tools.ietf.org/html/rfc3161.
(Continued)

*Primary Examiner* — Vance M Little (57) ABSTRACT

In an industrial system, a data capture apparatus can be configured to operate as a unidirectional communication connection between a private network and a public network. The data capture apparatus can be further configured to time stamp data, for instance digitally sign data with a time stamp, so as ensure data integrity over the unidirectional communication connection, while maintaining physical isolation between the private network and public network.

20 Claims, 4 Drawing Sheets

(56) References Cited

OTHER PUBLICATIONS

S. Santesson et al.; IETF RFC 5816, "ESSCertIDv2 Update for RFC 3161", Internet Engineering Task Force (IETF); https://tools.ietf.org/html/rfc5816; Mar. 2010.
OpenSSL "ts command", https://www.openssl.org/docs/man1.0.2/apps/ts.html.
International Search Report corresponding to PCT application No. PCT/US2021/031484; 9 pages.
Anonymous: "Data Capture Unit (DCU) Smart, unidirectional, unobtrusive and undetectable network tap and one-way gateway for monitoring of critical networks"; XP055640602; URL:https://web.archive.org/web/20190416164427if/https://assets.new.siemens.com/siemens/assets/public.1513615222.9872fe0e3f7b7721eca022dc33274fl6c93b596c.dcudatasheet-b10183-01-7600.pdf / Apr. 16, 2019.
Weber, Ricarda et al: "Überwachung sicherheitskritischer Bahn-netzwerke mittels eines Einweg-Gateways—Monitoring safety-critical railway networks using unidirectional gateways"; Signal Und Draht: Signalling & Datacommunication; vol. 110; No. 9; pp. 21-28; XP055509675; ISSN: 0037-4997 / Sep. 7, 2018.
Boo-Sun, Jeon et al.: "A Retransmission Method for Improving Transmission Reliability in One-way Transmission" Communication and Network Security; pp. 109-113; XP058386878; DOI: 10.1145/3163058.3163075; ISBN: 978-1-4503-5349-6 / Nov. 24, 2017.
Wikipedia: "Trusted timestamping—Wikipedia"; XP055828768; URL: https://en.wikipedia.org/w/index.php?title=Trusted_timestamping&oldid=954975726 / May 5, 2020.

* cited by examiner

TIME-STAMPING FOR INDUSTRIAL UNIDIRECTIONAL COMMUNICATION DEVICE WITH DATA INTEGRITY MANAGEMENT

BACKGROUND

Cyber-attacks on private computer networks have long been at the forefront of detection and protection efforts using information technology. It is recognized herein, however, that the threat of cyber attacker intrusion to industrial systems, such as automation and control systems that support critical infrastructure, is gaining attention. Due to aspects such as, for example, vertical integration of the production systems and horizontal integration of the value chain, industrial control system (ICS) networks are often directly or indirectly connected to IT networks (office network) and the Internet, thereby offering an opportunity for cyber attackers to penetrate such environments and exploit any existing vulnerabilities. It is further recognized herein that OT (Operations Technology) systems such as, for example, programmable logic controllers (PLCs), Distributed Control Systems (DCS), motion controllers, Supervisory Control and Data Acquisition (SCADA) servers, and Human Machine Interfaces (HMIs), offer many additional challenges when it comes to deploying security measures.

Further, attack methods have evolved from simple methods performed by curious hackers, to advanced persistent threats (APTs) carefully designed by highly motivated top experts, sometimes with extended resources sponsored by nation states. Detecting such targeted attacks and other general attack campaigns might require, in some cases, the adoption of security monitoring techniques, including signature-based intrusion detection, behavioral based anomaly detection, endpoint detection and response (EDR), among others. Further still, in some cases, network or host-based security detection mechanisms adopted within enterprise information technology (IT) systems do not translate to industrial control systems, for example, because some industrial systems require non-intrusive methods that minimize the risk of system interruptions. Additionally, OT systems often include a significant amount of legacy equipment that do easily support new embedded systems such as, for example, systems that perform intrusive and system profiling adopted by port scans and vulnerability enumeration tools.

It is also recognized herein that current approaches to protecting against intrusion to industrial systems lack capabilities particularly, for example, related to information assurance and integrity verification. Such shortcomings can be particular harmful, for example, in cases where the information systems can define highly critical or mission critical information systems.

BRIEF SUMMARY

Embodiments of the invention address and overcome one or more of the described-herein shortcomings by providing methods, systems, and apparatuses that enhance security capabilities in industrial control systems. For example, a data capture apparatus can be configured to operate as a unidirectional communication connection between a private network and a public network. The data capture apparatus can be further configured to time stamp and encrypt data from the private network, so as ensure data integrity over the unidirectional communication connection. For example, the data capture apparatus can apply digitally signed time stamps to data.

In an example aspect, a data capture apparatus includes a sender machine, a receiver machine, and monitoring apparatus between the sender machine and the receiver machine. The receiver machine can include: a unidirectional network interface coupled to one or more devices of the private network; an input coupled to a wire; and an output coupled to the wire. The sender machine can be configured to collect data from the one or more devices of a private or operational network. The data capture apparatus can further include a monitoring apparatus that includes the wire coupled to the output and input of the sender machine so as to define a loop. The monitoring apparatus can further include an interceptor inductively coupled to the loop so as to define the unidirectional communication connection. The receiver machine can be coupled to the interceptor and to the private network. The receiver machine can be configured to receive data from the sender machine over the unidirectional communication connection defined by the monitoring apparatus from the sender machine to the receiver machine. The sender machine can further include a time stamping module configured to apply a time stamp, for instance a digitally signed time stamp, to data that is sent to the receiver machine. The receiver machine can verify integrity of data it receives using the digitally signed time stamp. Further, the receiver machine can send verified data to systems within a public network, for example, for analysis.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
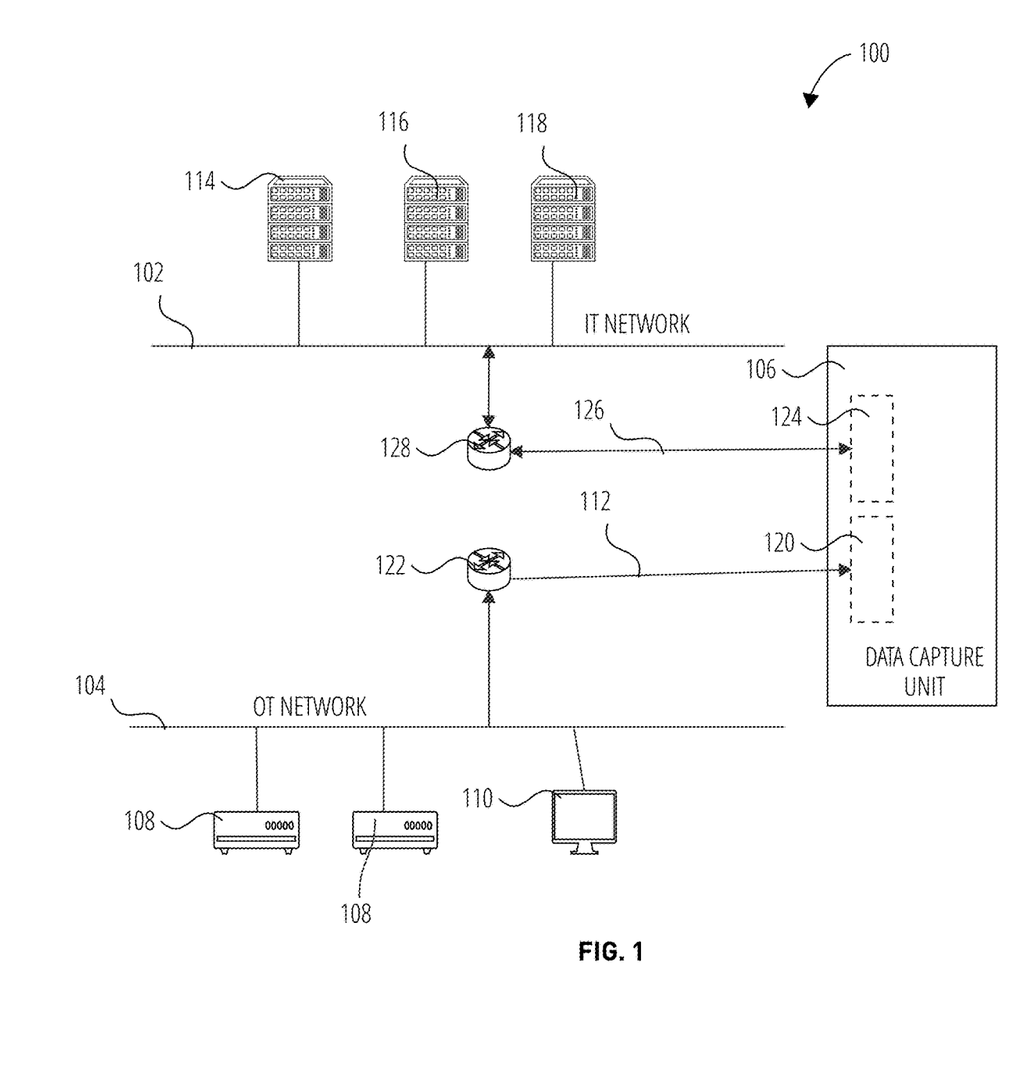
FIG. 1 is a block diagram of a data capture unit (DCU) apparatus deployed within an example industrial control system (ICS).

Referring initially to FIG. 1, an example distributed control system (DCS) or industrial control system (ICS) 100 includes an office or corporate IT network 102 and an operation technology (OT) or production network 104 communicatively coupled to the IT network 102 via a data control apparatus or data control unit (DCU) 106. The IT network 102 can define an office or public network that has lower security requirements than the OT network 104, which can define a private or critical production network. The DCU 106 can be configured to operate as a unidirectional communication connection between a private network and a public network. The DCU 106 can collect network traffic data that is shared over the OT network 104, via a communication link 112 from the OT network 104 to the DCU 106. In particular, for example, the OT network 104 can include various production machines configured to work together to perform one or more manufacturing operations. Example production machines of the production network 104 can include, without limitation, robots and other field devices, such as sensors, actuators, or other machines, which can be controlled by a respective programmable logic controller (PLC) 108. The PLC 108 can send instructions to respective field devices. In some cases, a given PLC 108 can be coupled, or the OT network 104 can otherwise include, human machine interfaces (HMIs) 110. It will be understood that the ICS 100 is simplified for purposes of example. That is, the ICS 100 may include additional or alternative nodes or systems, for instance other network devices, that define alternative configurations, and all such configurations are contemplated as being within the scope of this disclosure.

In some cases, the communication link 112 is configured to receive data from the OT network 104, but not send data to the production network 104, such that that communication link 112 defines a unidirectional communication link from the OT network 104 to the DCU 106. Network packets that are collected by the DCU 106 can be used by cybersecurity functions that are performed on the IT network 102. The collected network packets can be sent from the DCU 106 to the IT network 102, in particular to systems within the IT network 102 such as, for example and without limitation, an Intrusion Detection System (IDS) 114, a Security Information and Event Management (SIEM) system 116, and a Forensic Analysis system 118. By way of example, collected data packets can be provided to the IT network 102 for verifications, for instance verifications required by safety regulations or the like. Such verifications may relate to the data packets at the communication level. For example, the sender or recipient of data packets can be verified, or the timing associated with various commands or settings that sent within the OT network 104 of the ICS 100 can be verified. The verifications and other security functionality performed within the IT network 102, in some cases, cannot be performed properly if the integrity of the collected data is not guaranteed. For example, if the data that is collected from the OT network 104 is corrupted, the collected data might not represent the reality of the network traffic within the OT network 104 the corrupted data cannot reflect the reality of network traffic. Thus, it is recognized herein that the integrity of data within the DCU 106 is important to the security functionality provided by the IT network 102, among other functions.

With continuing reference to FIG. 1, the DCU 106 can include Ethernet ports 120 that are connected to the OT network 104, for instance via a switch 122. The Ethernet ports 120 can define a unidirectional interface that is configured to receive raw data packets without being able to send packets out. The DCU 106 can further include a multi-directional interface or port 124 that can communicate with the IT network 102, for instance via a switch 128. In particular, the multi-directional interface 124 can send data to, and receive data from, the IDS 114, the SIEM system 116, and the Forensic Analysis system 118. In some cases, for example, the multi-directional port 124 is exposed to the IT network 102 such that the IDS 114, the SIEM system 116, and the Forensic Analysis system 118 can access data packets collected by the DCU 106, so as to record packets and/or perform data packet analysis on the recorded packets. Thus, it is recognized herein that the integrity of the packets at rest and in motion can be critical for various functions related to the DCU 106.

By way of example, if integrity of the collected data is not verified, a hacker might manipulate (e.g., change, delete, create) the collected data on the DCU 106. For example, a hacker might access the DCU 106 over the IT network 102 via the multi-directional port 124, so as to manipulate data on the DCU 106. By way of another example, a hacker might hijack a communication session between the DCU 106 and other devices, for instance a log server or IDS 114, by sending faked data over a communication link 126 between the DCU 106 and IT network 102, so as to perform a man-in-the-middle (MITM) cyberattack.

In some cases, industrial control systems include data capture apparatuses that can only send collected data packets to the IT network over a TCP stream by providing an http link for configuration, which, as recognized herein, might not be secure against cyberattacks. For example, a hacker could use a computing device that connects to the IT network to directly or indirectly access the DCU, manipulate collected data within the DCU, and/or hijack the communication link between the DCU and other devices, such as an IDS or SIEM system. In accordance with various embodiments described herein, however, the data that is used within the IT network 102 for analysis can be verified so as to ensure that no tampering has been done to the data.

Figure 2:
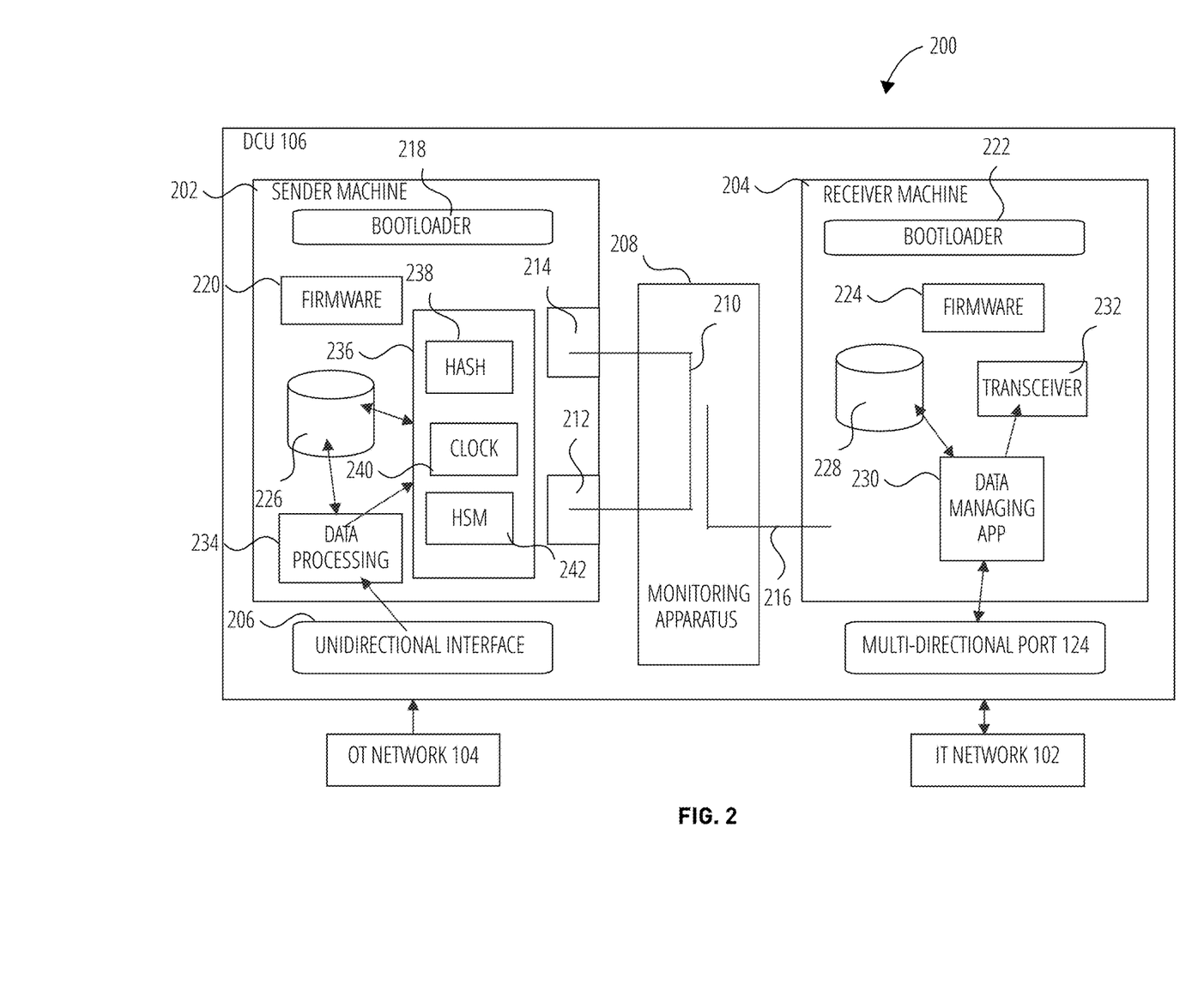
FIG. 2 is another block diagram of the DCU according to an example embodiment.

Referring also to FIG. 2, an example ICS 200 can include the DCU 106. In accordance with an example embodiment, the DCU 106 can include a first or sender machine 202 and a second or receiver machine 204 configured to receive data from the sender machine 202. The DCU 106 can further include a unidirectional network interface 206 coupled to the sender machine 202 and the private OT network 104, such that the sender machine 202 can receive data from the private OT 104 via the unidirectional network interface 206. In an example, the unidirectional network interface 206 includes the Ethernet ports 120. The sender machine 202 can include the unidirectional network interface 206 that can be coupled to one or more devices of a private network, for instance the OT network 104. The multi-directional port 124 of the DCU 106 can be coupled to the receiver machine 204 and IT network 102, such that the receiver machine 204 can send data to, or receive data from, the IT network 102. In some examples, the unidirectional network interface 206 only allows data to be received from, and not sent to, the OT network 104, such that only unidirectional communications are allowed from the OT network 104 to the public IT network 102. The OT or production network 104 may define a critical or private network such as, for example, a network for industrial automation, a financial network, a network for railway automation and control, a life-critical system, or the like. In some cases, the OT network 104 obtains monitoring and evaluation services from a service provider located in the IT network 102, which can define an insecure public network, such as an internet-based or cloud-based service capable of providing intensive data analysis related to security or diagnostics. The DCU 106 can listen on the unidirectional network interface 206, in particular the Ethernet ports 120, in a passive manner, for instance by performing sniffing operations, such that active requests are not sent to devices within the OT network 104.

The DCU can further include a monitoring apparatus 208 configured to transfer data from the sender machine 202 to the receiver machine 204 without permitting data to be transferred from the receiver machine 204 to the sender machine 202. In some examples, the monitoring apparatus 208 can define a data copier or network tap, so as to provide unidirectional data transmission from the sender machine 202 to the receiver machine 204 without the sender machine 202 and receiver machine 204 being hardwired together. In an example, the monitoring apparatus 208 can include a wire 210 arranged in a loop, such that the wire 210 is connected to an output 212 defined by the sender machine 202, and to an input 214 defined by the sender machine 202. Thus, the monitoring apparatus 208 can include the wire 210 coupled to the input 214 and the output 212 so as to define the loop. Data can be transmitted by the sender machine 202 at the output 212, along the wire 210, and back to the sender machine 202 at the input. The input 214 and the output 212 of the sender machine 202 can be isolated from the unidirectional network interface 206. In an example, the monitoring apparatus 208, in particular the wire 210, can define an inductor so as to transfer data from the sender machine 202 to the receiver machine 204 without a conductive wire or cable connected between the sender machine 202 and the receiver machine 204. For example, the monitoring apparatus 208 can further include an interceptor 216 that is connected to the receiver machine 204. The interceptor 216 can be inductively coupled to the loop so as to define a unidirectional communication connection between the sender machine 202 and the receiver machine 204, and thus between the OT network 104 and the IT network 102. In some examples, the interceptor 216 can define a conductive wire such that the conductive wire and the wire 210 that defines the loop can be inductively coupled with one another.

In various examples, the receiver machine 204 can be coupled to the interceptor 216 and to the private OT network 104 so as to be configured to receive data from the sender machine 202 over the unidirectional communication connection defined by the monitoring apparatus from the sender machine to the receiver machine. Thus, in an example, a data stream can pass through the loop from the output 212 through the wire 210 to the input 214. Such a data stream can be duplicated inductively by the interceptor 216, and passed to the receiver machine 204 via the connection between the interceptor 216, for instance the conductive wire, and the receiver machine 204. The original data stream that passes through the loop can remain unchanged from the output 212 to the input 214. Thus, the monitoring apparatus 208 can define an inductive configuration that connects the sender machine 202 to the receiver machine 204, and thus connects the OT network 104 to the IT network 102. In particular, the monitoring apparatus 208 can define a physically separated connection between the OT network 104 and the IT network 102. In some cases, only duplicated data from the wire 210 that defines the loop can be transferred unidirectionally to the receiver machine 204 due to the inductive configuration of the monitoring apparatus 208. That is, in various examples, data cannot flow from the interceptor 216 to the wire 210 that defines the loop, thereby providing the OT network 104 with freedom from interference with respect to the IT network 102. In an example, the interceptor 216 functions as a network test access point (TAP) that intercepts the transmission between the output 212 and the input 214 defined by the sender machine 202, and copies that data to a monitor port the receiver machine 204. In another example, the interceptor 216 can be implemented as a switched port analyzer (SPAN) that performs port mirroring of the intercepted transmissions on the wire 210 that defines the loop.

Still referring to FIG. 2, the sender machine 202 can further include a bootloader 218 and firmware 220 that can include operational instructions for the sender machine 202, and thus for the DCU 106. Similarly, the receiver machine 204 can further include a bootloader 222 and firmware 224 that can include operational instructions for the receiver machine 204, and thus the DCU 106. The DCU 106 can also include one or more databases. For example, the sender machine 202 can include a sender database 226 and the receiver machine 204 can include a receiver database 228. In an example, data that is copied from the sender machine 202 can be buffered in the receiver database 228. Similarly, data that is received by the sender machine 202 from the OT network 104 can be buffered in the sender database 226, for example, so that the data can be transmitted via the wire 210 of the monitoring apparatus 208 at regular intervals, predefined times, or the like.

In various examples, the DCU 106 can include one or more processors that may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of hardware and firmware. In an example aspect, any software and firmware deployed in the receiver machine 204 can executed by a processor of the receiver machine 204. In an aspect, any software and firmware deployed in the sender machine 202 can be executed by a processor of the sender machine 202, so as to maintain physical isolation between the pubic IT network 102 and the private OT network 104, and to ensure unidirectional communication. Processors of the DCU 106 may also comprise memory storing machine-readable instructions executable for performing tasks. Processors of the DCU 106 may use or comprise the capabilities of a computer, controller or microprocessor, for example, and be conditioned using executable instructions to perform special purpose functions not performed by a general purpose computer. The DCU 106 may include one or more processors that include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, processors of the DCU 106 may have any suitable microarchitecture design that includes any number of constituent components such as, for example, registers, multiplexers, arithmetic logic units, cache controllers for controlling read/write operations to cache memory, branch predictors, or the like. The microarchitecture design of the processors may be capable of supporting any of a variety of instruction sets.

With continuing reference to FIG. 2, the receiver machine 204 may include various applications or modules, such as embedded cyber security applications for supporting security monitoring and diagnosis related to the OT network 104. For example, the sender machine 202 can include a transceiver module 232 configured to send and receive data to devices in various networks such as, for example, GPRS, LTE, or 5G networks. Additionally, or alternatively, the receiver machine 204 can include a data managing application 230 that can be configured with a given data processing policy, and can process data in accordance with the data processing policy. In an example, the data managing application 230 can read and/or delete data from the receiver database 228. In some cases, the data managing application 230 can compute a hash and verify that it computes the same hash as the sender machine 202. Further, the data managing application 230 can filter and/or compress data in accordance with a policy. Further still, the data managing application 230 can transmit copied data from the sender machine 202 to the IT network 102, in particular, for example, to the IDS 114, the SIEM system 116, or the Forensic Analysis system 118. The duplicated data can be transmitted via the transceiver module 232 or multi-directional port 124. In some cases, data that is received in the receiver machine 204 can be transmitted to systems within the IT network 102 by way of a push mechanism, for instance by passing data as in a publish-and-subscribe approach. Additionally, or alternatively, data can be buffered in the receiver database 228 and can be transmitted by way of a pull mechanism by systems within the IT network 102. For example, systems can actively request data from the receiver database 228 or the receiver machine 204, for instance via the multi-directional port 124.

The sender machine 202 can also include various applications or modules in accordance with various embodiments. In some examples, the sender machine 202 can include a data processing application 234 configured to receive data from data capture ports, for instance Ethernet ports 120, of the unidirectional network interface 206. In some cases, the data processing application 234 can be configured to filter data in accordance with a policy. Such a policy or configuration can be obtained, in some examples, by the data processing application 234 from the sender database 226. The sender machine 202 can further include a time stamping module 236 configured to use time stamps to provide data integrity services for the DCU 106, as further described herein. In an example configuration, the data processing application 234 is separate from the time stamping module 236 such that the data processing application 234 can be updated or scaled without interrupting the time stamping module 236. In an example, the time stamping module 236 can include, and thus the sender machine 202 can include, a hash application 238, a clock source 240, and a hardware security module 242. The clock source 240 can define a low stratum clock source, a high precision clock, or the like. Thus, in some cases, applications and modules within the sender machine 202 can perform operations for a trusted side of the ICS 100 (and DCU 106), and applications and modules within the receiver machine 204 can perform operations for an untrusted side of the ICS 100 (and DCU 106). Further, the sender machine 202 can ensure data integrity and can be protected such that it cannot be configured or operated by users, and the receiver machine 204 can be managed by users for data management.

In some examples, the sender machine 202 and the receiver machine 204 each define an application layer on which respective modular applications can be deployed. Such a configuration can allow impromptu addition and removal of applications. The modular applications can be distributed and deployed from an application marketplace where device operators can select applications as appropriate and automatically install or remove them via a management tool provided as part of the DCU 106. Modular applications can allow control of performance overhead for a running application by dividing functionalities among applications. In some cases, the DCU 106 is easily reconfigurable without having to restructure or modify the architecture of the secure OT network 104. Additionally, deployment of modular applications is flexible by allowing deployment of applications or libraries that are not specific to any one vendor or manufacturer, including the original equipment manufacturer (OEM). This flexibility allows maintaining protection of the OT network 104 with up-to-date deployment of new software-based technologies including analytics capabilities, as they become available, or in the event that one particular application is revealed to possess a newly discovered vulnerability requiring a patch or replacement with an application from a different vendor. One or more of the security and processing applications of the application layers can provide cost effective, decentralized analysis of captured date and early warning capability by alerting an operator of the OT network 104 upon discovery of anomalous data packets.

With continuing reference to FIG. 2, in accordance with an example embodiment, to ensure that no tampering is performed on data that is used or analyzed on the IT network 102, or the untrusted side, the date or time of creation of the data is safeguarded. For example, data that is transmitted to the receiver machine 204 can be timestamped by the time stamping module 236 in a trustworthy manner. Such trusted timestamping can enable the existence of certain information to be verified at a given point in time. Further, such verifications can prevent the modification of data, so as to ensure the integrity of the data. In an example, the sender machine 202 generates a tamper-proof timestamp for its digital content, and then the receiver machine 204 can trust the content by verifying the timestamp of the data it receives from the sender machine 202. In particular, by way of example, the sender machine 202, for instance the time stamping module 236, can perform the IETF PKI time stamping protocol (TSP) to generate a digitally signed chained number associated with the data that the sender machine 202 sends to the receiver machine 204.

Further, as described herein, the architecture and structure of the DCU 106 can prevent exposing data from the OT network 104 to other sources while collecting and processing data. Operations that are performed on the collected data (e.g., send, delete, etc.) can be logged within the DCU 106. Configurations of the DCU 106 can also be logged. By way of example, the DCU 106 can reside in a cabinet or roadside, and operations can be logged by recording command or settings that are received from an HMI associated with the DCU 106. Such traffic (e.g., commands, settings) can be digitally signed with time stamps (e.g., in accordance with the IETF PKI TSP) while preventing network and traffic exposure to unauthorized networks or devices.

In various examples, the DCU 106 can collect data by listening on its data capturing ports, for instance the Ethernet ports 120, of the unidirectional network interface 206 in a passive manner. The collected data can be sent to the data processing application 234. The data processing application 234 can be configured, for example, by obtaining configuration data from the sender database 226. In an example, the data processing application 234 can filter the collected data based on the configuration. By way of example, the configuration data may indicate which packets should be logged, when packets should be logged, or the like. By way of yet another example, configuration data obtained from the sender database 226 may inform the data processing application 234 of a protocol to be implemented. For example, the protocol may indicate which data should be time stamped, among other requirements. Thus, the DCU 106 may perform time stamping based on a configuration or protocol. The data processing application 234 can also compress the data for the time stamping module 236. In some cases, the data processing application 234 can filter and compress the collected data before storing the data in the sender database 226. Such filtering and compression can also conserve bandwidth usage when sending data out via the multi-directional port 124 to the systems within the IT network 102. In some examples, the systems of IT network 102, for instance the IDS 114, SIEM system 116, or the Forensic Analysis system 118, can recover the compressed data. Additionally, or alternatively, the data processing application can include a deep packet inspection engine configured to read the collected data packets at the application layer. The deep packet inspection engine can be further configured to determine which packets should be protected in terms of integrity, so as to conserve computational power of the DCU 106.

For example, in some cases, the DCU 106 can be configured with specific protocol dissectors associated with packets that are to be encrypted and time stamped. During such a configuration, a user interface of the DCU 106 can indicate the breakdown packet structure for browsing sample packets. In an example, a filter, for instance a Wireshark filter, can be applied to portions of the packets that are to be protected, for instance by a digitally signed time stamp. Thus, when collected data packets or portions of the collected data packets are determined by the DCU 106 to be confidential, the data processing application 234 can encrypt those data packets or those portions of the data packets. In some cases, data packets that are collected by the sender machine 202 are encrypted before being stored in the sender database 206. Thus, if sensitive traffic is received that is not encrypted, the DCU 106 can store such sensitive or confidential data as encrypted data instead of clear text. In various examples, the data processing application 234 selects which data is sent to the time stamping module 236. Thus, in some cases, the data processing application 234 can select which data is time-stamped and/or hashed.

The time stamping module 236 can perform the TSP, among other techniques, so as to apply a time stamp, for instance a digitally encrypted time stamp, to data. The time stamping module 236 can be configured to receive at least a portion of the data that is collected from the unidirectional network interface 206. The hash application 238, and thus the time stamping module 236, can be configured to computing a message digest or hash, for instance a first hash value, that represents the portion of the data that is collected from the unidirectional network interface 206. In some cases, hashes are only generated for the most meaningful data, which can be determined by a filter, for instance a Wireshark filter, that can be applied to the collected data so as to select the portion of the data that is hashed. Examples of data for which hash values or hashes can be generated by the hash application 238 include, without limitation, MAC source/destination addresses, IP source/destination addresses, timestamps, protocols, packet sizes, or packet data units (PDUs). In another example, the time stamping module 236 generates a message digest, for instance hash values, for the payload of the data packets rather than entire raw data packets. In yet another example, the time stamping module 236 can generate a message digest, for instance a hash, for all data that is sent over the wire 210 to the receiver machine 204. It will be understood that alternative data can be selected for hashing as desired, for instance by the data processing application 234. The hashes of data can guarantee the integrity of the data associated with the hashes.

The time stamping module 236 can use the clock source 240 to apply a time stamp to the hashed data or hash value, for instance the first hash value. Thus, in some cases, the time stamping module 236 generates a time stamp for all data that is transmitted over the wire 210 to the receiver machine 204. In other examples, specific data is selected for time stamping, for example payload data, though it will be understood that data can be selected for time stamping as desired, for instance by the data processing application 234.

Alternatively, or additionally, the receiver machine 204 can include a time stamping module configured to time stamp data as it is received from the sender machine 202. Thus, the receiver machine 204 can also include a clock, for instance a low stratum clock source or high precision clock, such as the clock source 240.

The hash application 238, and thus the time stamping module 236, can be configured to calculate or compute a hash, for instance a second hash value, representative of the hashed data (e.g., a first hash value) and the time stamp so as generate hashed time-stamped data. In some examples, the hashed time-stamped data can be sent to the hardware security module 242, where the hardware security module 242 can sign the data, for instance with a digital certificate of the DCU 106, so as to generate hashed time-stamped data that is signed, or signed-hashed time-stamped data. In some examples, the hardware security module 242 can compute a cryptographic hash function of the data. The signed data, which can include a hash of the time stamp and collected data, can be written to the receiver database 228 by transmitting the data over the wire 210. Further, the data, which can include a signed hash of the time stamp and all or a portion of the data collected by the sender machine 202, can be sent to the receiver machine 204 at any time or specific times. For example, the signed hash can be sent at specific times of day, and the receiver machine 204 can be configured to listen to the sender machine 202 at those specific times. As a result of the isolation and unidirectional properties of the sender machine 202 and receiver machine 204, as described herein, in various configurations the receiver machine 204 is not able to request data from the sender machine 202. Therefore, in various examples, the receiver machine 204 is configured to listen to the sender machine 202 at predetermined or specific times. By way of another example, the sender machine 202 can broadcast its data during specific time slots, and the receiver machine 204 can be configured to listen during those time slots.

From the receiver database 228, the data managing application 230 can read data, delete data, and process data in accordance with a data processing policy. For example, the data managing application 230 can filter, size, or compress data so as to process the data from the receiver database 228. In particular, in some examples, the data managing application 230 can verify a signature or certificate from the sender machine 202, for instance using public key infrastructure (PKI). The data managing application 230, and thus the receiver machine 204, can compute a hash and verify that it computes the same hash as the sender machine 202. In an example, the receiver machine 204 can receive an encrypted hash from the sender machine 202, and decrypt the encrypted hash with a public key of the corresponding key pair. After decrypting the hash, the hash of the received message or data (which can be saved so that it can be retrieved at any time) can be computed and compared to the corresponding decrypted hash. If the hashes do not match, the receiver machine 204, and thus the DCU 106, can determine that the data may have been tampered with or otherwise altered. If the hashes match, the DCU 106, in particular the receiver machine 204, can verify the integrity of the data.

Further, the data managing application 230 can send the data that it reads and/or processes to the transceiver module 232 or to the multi-directional port 124 for transmission to the required destination. In some examples, the data managing application 230 logs operations it performs, and thus operations that the DCU 106 performs, in the sender database 226. Further, in some examples, security professionals can configure the DCU 106 via the data managing application 230 and/or the sender database 226. For example, security professionals can perform operations (e.g., read, delete, etc.) on the data that is logged by the data managing application 230, and can manage security parameters, such as public key infrastructure (PKI), digital certificates and cryptographic keys.

Figure 3:
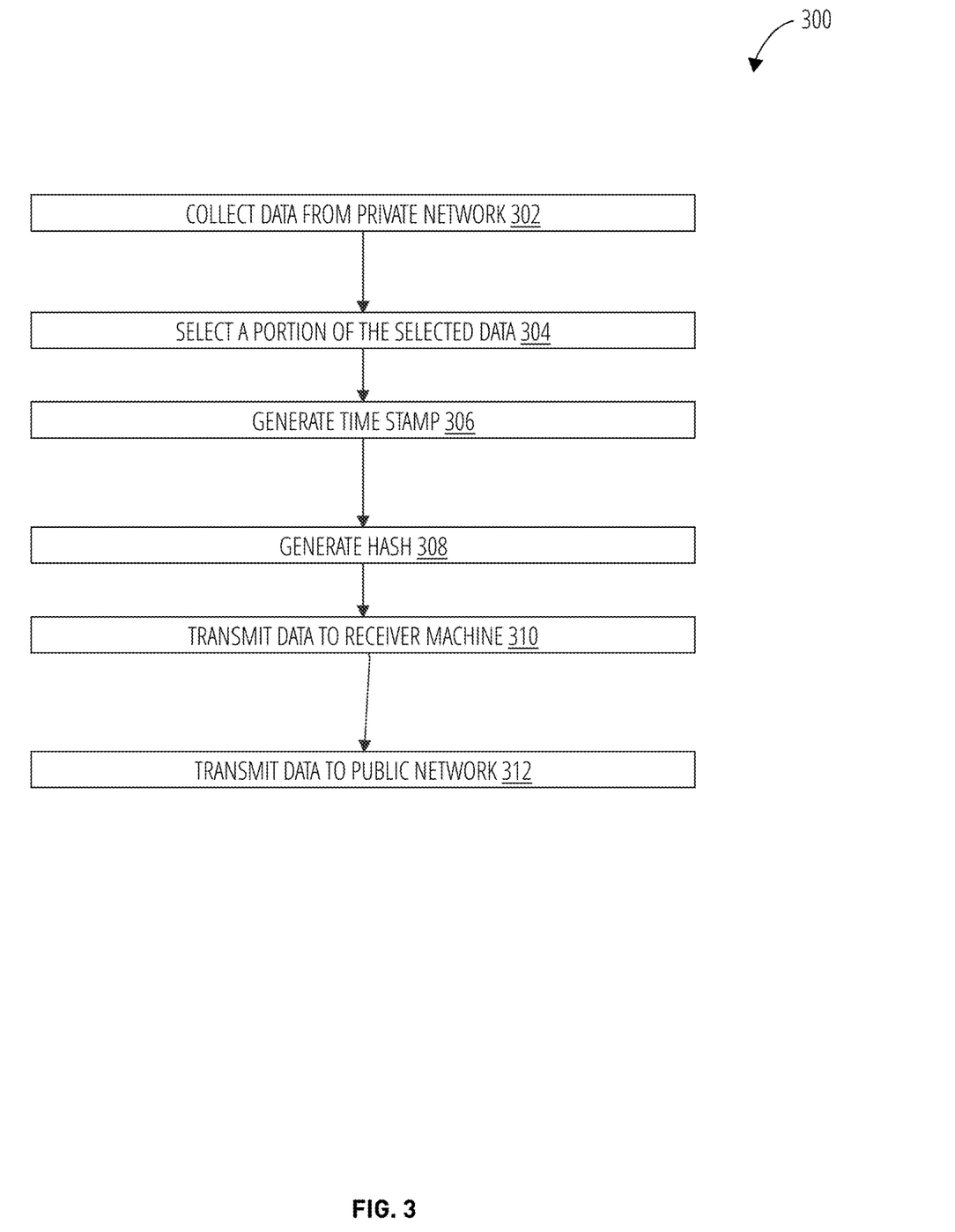
FIG. 3 is a flow diagram that can be performed by a computing system and other nodes within the ICS, and thus the ICS itself, in accordance with an example embodiment.

Referring now to FIG. 3, an example operation 300 can be performed by the DCU 106 that includes the sender machine 202 and the receiver machine 204 physically isolated from the sender machine 202. The monitoring apparatus 208 can be disposed between the sender machine 202 and the receiver machine 204, and the DCU 106 can be disposed between a private network and a public network. Thus, the monitoring apparatus 208 can be disposed between the private network and the public network. At 302, the sender machine 202 can collect data from one or more devices of the private network. In some cases, the data processing application 234 listens to the unidirectional network interface 206 to collect data from the private network. At 304, the sender machine 202 can select a portion of the collected data for transmission to the receiver machine 204. In an example, the portion of the collected data that is selected includes all of the data that is collected from the private network. In another example, the portion of the collected data that is selected is based on parameters associated with the data that is collected from the unidirectional network interface 206. The parameters may indicate various attributes of the data, such as whether specific portions of the data are part of the payload, protocols associated with the data, a source of the data, a destination of the data, or a type or classification associated with the data.

Still referring to FIG. 3, at 306, the sender machine 202 can generate a time stamp associated with the portion of the collected data that is selected. In some cases, the time stamp can be applied to a hash value, for instance a first hash value, of the selected data. In some examples, a hash value, for instance a second hash value, is generated of the first hash value and the time stamp. At 308, one or more hashes can be generated by the sender machine 202. At 310, the sender machine 202 can send the time stamp and the portion of the collected data, for instance as a hash, along the wire 210 defined by the monitoring apparatus 208, so as to transmit the portion of the collected data and the time stamp to the receiver machine 204 over a unidirectional communication connection between the sender machine 202 and the receiver machine 204. The receiver machine 204 can also compute one or more hashes to verify integrity of the data from the sender machine 202. In some cases, the sender machine 202 sends data at one or more specific times along the wire 210 from the output 212 to the input 214, so as to send the data to the receiver machine 204 at the one or more specific times. The receiver machine 204 can listen to the monitoring apparatus 208 at the one or more specific times, so as to receive the data from the sender machine 202. The receiver machine 204 can decrypt a hash received from the sender machine 202, and can compute a corresponding hash from the data it receives from the sender machine 202, so as to verify the integrity of the data. Further, at 312, the receiver machine 204 can send the portion of the collected data to one or more systems within the public network.

In various examples, referring again to FIGS. 1 and 2, the DCU 106 is configured with protective features such that the receiver machine 204, sender machine 202, and monitoring apparatus 208 are capable of operating in a physically harsh environment, such as a manufacturing, power generation, mobility, or other industrial environment. For example, the DCU 106 can include a protective housing that can prevent electromagnetic interference from industrial processes. The DCU 106 can also define or be supported by resilient mounts that can prevent abnormal operation due to vibration. Further still, the DCU 106 can define various thermal management features such for example and without limitation, heat sinks, fans, mastics, or the like, which can protect against overheating in a thermally harsh environment. Thus, the DCU 106 can provide a self-contained, industrial grade, single device solution for data integrity verification or intrusion detection in a protected network free from interference, and can avoid directly connected data collection by a non-secure intrusion detection system. Further, unlike solutions that involve installation of an app suite onto a monitoring device, the DCU 106 is capable of reconfigurable modular application functionality.

By way of example, and without limitation as it will be understood that the DCU 106 can be deployed in various alternative industrial control systems, the DCU 106 can be used in a traffic enforcement system. In particular, the DCU 106 that includes embedded time stamping and digital signature/certificate capabilities can be connected to one or more cameras that are configured to monitor pedestrian or automobile traffic. The one or more cameras can be coupled to the unidirectional network interface 206. Thus, data (e.g., images) that is collected by the one or more cameras can be digitally time-stamped and signed by the sender machine 202, and sent to the receiver machine 204. In an example, the receiver machine 204 can store the data it receives from the sender machine 202, for instance in the receiver database 228. Additionally, or alternatively, the receiver machine 204 can send the data over the transceiver module 232, for instance using LTE or similar technologies, to an evaluation system, for instance to a traffic enforcement and control office or system.

As described above, and without being bound by theory, the DCU 106 can be configured in accordance with the description herein so as to prevent hackers from manipulating OT data or sending faked data to replace collected OT data, or to prevent hackers from otherwise hijacking communication sessions. Thus, the DCU 106 can define a bridge, in particular a secure link, between an IT environment, for instance the IT network 102, and an OT environment, for instance the production network 104. Further, as described herein the DCU 106 can define self-contained data storage capabilities, and can process and compress collected data, thereby conserving bandwidth for sending data over an IT network. Using time stamping and security measures, such as PKI digital certificates for example, the DCU 106 can guarantee the integrity of data. For example, the DCU 106 can be configured to automatically digitally sign collected data traffic for forensic analysis, among other analysis. The DCU 106 can be configured to verify digital certificates and signatures from within and outside of the DCU 106. For example, the receiver machine 204 can verify digital certificates and signatures that received from the sender machine 202. Relatedly, the DCU 106 can generate and manage certificates within the DCU 106. Thus, as further described herein, the DCU 106 can define a device that enables unidirectional communication and traffic capture, while providing time stamp-based PKI capabilities. Further, the DCU 106 can log its configurations and operations on collected data within the DCU 106.

Figure 4:
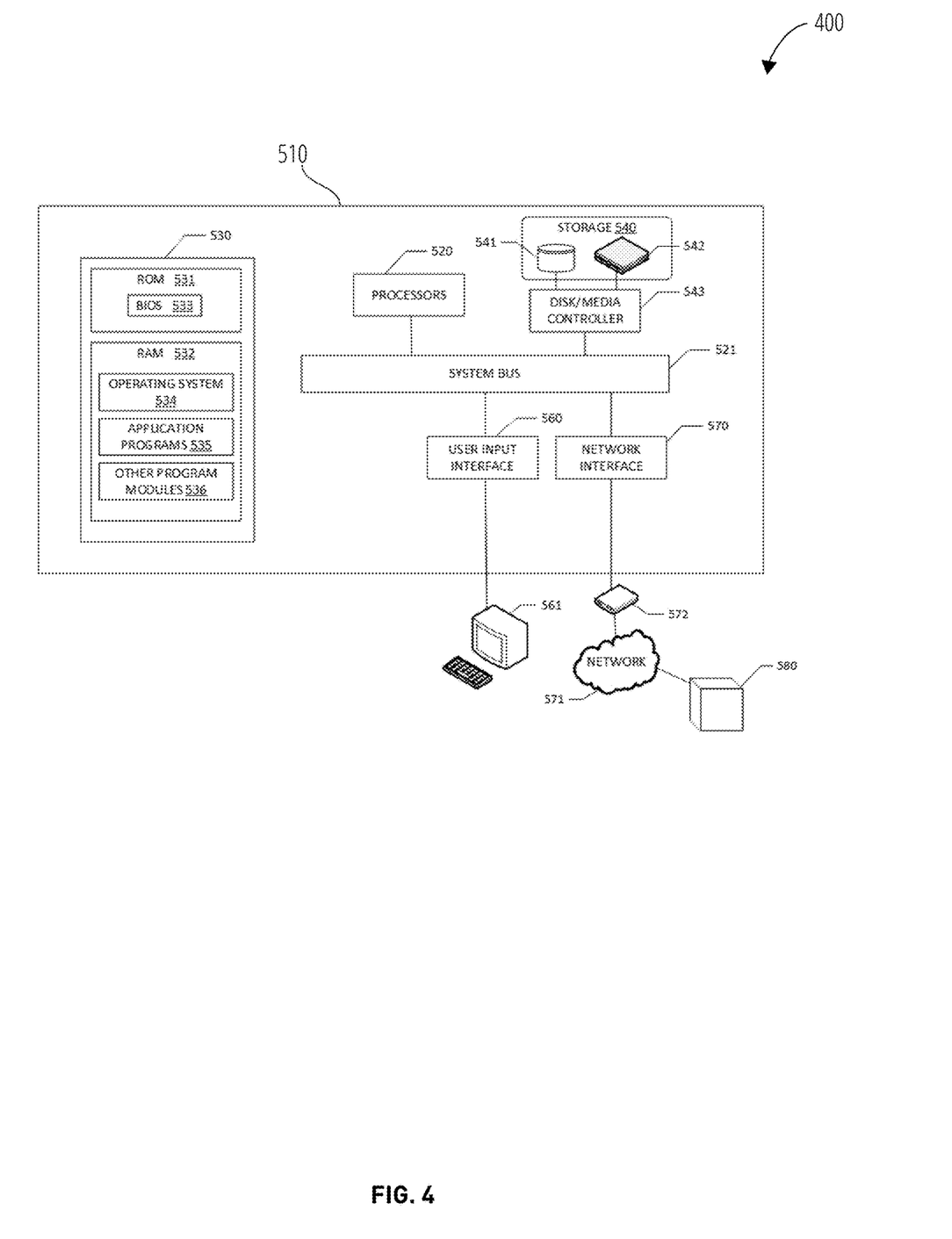
FIG. 4 illustrates a computing environment within which embodiments of the disclosure may be implemented.

FIG. 4 illustrates an example of a computing environment within which embodiments of the present disclosure may be implemented. A computing environment 400 includes a computer system 510 that may include a communication mechanism such as a system bus 521 or other communication mechanism for communicating information within the computer system 510. The computer system 510 further includes one or more processors 520 coupled with the system bus 521 for processing the information. The robot device 104 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hardwired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 400 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 4 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A data capture apparatus configured to operate as a unidirectional communication connection between a private network and a public network, the data capture apparatus comprising:
    a sender machine comprising: 1) a unidirectional network interface coupled to one or more devices of the private network; 2) an input coupled to a wire; and 3) an output coupled to the wire, the sender machine configured to collect data from the one or more devices of the private network;
    a monitoring apparatus comprising the wire coupled to the output and input of the sender machine so as to define a loop, the monitoring apparatus further comprising an interceptor inductively coupled to the loop so as to define the unidirectional communication connection; and
    a receiver machine coupled to the interceptor and to the public network, the receiver machine configured to receive data from the sender machine over the unidirectional communication connection defined by the monitoring apparatus from the sender machine to the receiver machine,
    wherein the sender machine further comprises a time stamping module configured to apply a time stamp to data that is sent to the receiver machine.

2. The data capture apparatus of claim 1, wherein the time stamping module is further configured to:
    receive at least a portion of the data that is collected from the unidirectional network interface;
    compute a first hash value representative of the portion of the data that is collected from the unidirectional network interface; and
    apply the time stamp to the first hash value.

3. The data capture apparatus of claim 2, wherein the time stamping module is further configured to:
compute a second hash value representative of the time stamp and the first hash value so as generate hashed time-stamped data.

4. The data capture apparatus of claim 3, wherein the sender machine further comprises a hardware security module configured to sign the hashed time-stamped data so as to generated signed-hashed time-stamped data.

5. The data capture apparatus of claim 4, wherein the sender machine is further configured to send the signed-hashed time-stamped data along the wire from the output to the input, so as to transmit the signed-hashed time-stamped data to the receiver machine.

6. The data capture apparatus of claim 5, wherein the receiver machine is further configured to compute the second hash value so as to verify integrity of the portion of the data that is collected from the unidirectional network interface.

7. The data capture apparatus of claim 1, wherein the time stamping module of the sender machine comprises a clock source configured to generate the time stamp.

8. The data capture apparatus of claim 1, the data capture apparatus further comprising a data processing application configured to:
listen to the unidirectional network interface so as to collect data from the one or more devices of the private network;
select the portion of the data that is collected from the unidirectional network interface; and
send the selected portion of the data to the time stamping module.

9. The data capture apparatus of claim 1, wherein the data processing application is further configured to select the portion of the data that is sent to the time stamping module based on parameters associated with the data collected from the unidirectional network interface.

10. The data capture apparatus of claim 1, wherein the sender machine is further configured to transmit data at one or more specific times along the wire from the output to the input, so as to send the data to the receiver machine at the one or more specific times.

11. The data capture apparatus of claim 1, wherein the receiver machine is configured to listen to the interceptor at the one or more specific times, so as to receive the data from the sender machine.

12. The data capture apparatus of claim 1, wherein the receiver machine further comprises a transceiver module configured to send data from the sender machine to one or more systems within the public network.

13. A method performed by a data capture apparatus that comprises a sender machine, a receiver machine physically isolated from the sender machine, and a monitoring apparatus between the sender machine and the receiver machine, the data capture apparatus disposed between a private network and a public network, method comprising:
the sender machine collecting data from one or more devices of the private network;
the sender machine selecting a portion of the collected data for transmission to the receiver machine;
generating a time stamp associated with the portion of the collected data; and
the sender machine sending the time stamp and the portion of the collected data along a wire defined by the monitoring apparatus, so as to transmit the portion of the collected data and the time stamp to the receiver machine over a unidirectional communication connection between the sender machine and the receiver.

14. The method of claim 13, the method further comprising:
the sender machine computing a first hash value representative of the portion of the collected data; and
applying the time stamp to the first hash value.

15. The method of claim 14, the method further comprising:
computing a second hash value representative of the time stamp and the first hash value so as to generate hashed time-stamped data.

16. The method of claim 15, the method further comprising:
the sender machine signing the hashed time-stamped data so as to generate signed-hashed time-stamped data.

17. The method of claim 16, wherein the sender machine defines an input and an output, the method further comprising:
sending the signed-hashed time-stamped data along the wire from the output to the input, so as to transmit the signed-hashed time-stamped data to the receiver machine.

18. The method of claim 13, the method further comprising:
the sender machine sending data at one or more specific times along the wire from the output to the input, so as to send the data to the receiver machine at the one or more specific times.

19. The method further of claim 18, the method further comprising:
the receiver machine listening to the monitoring apparatus at the one or more specific times, so as to receive the data from the sender machine;
the receiver machine storing the data; and
the receiver machine computing a hash of the data so as to verify the integrity of the data.

20. The method further of claim 13, wherein the sender machine selecting the portion of the collected data for transmission to the receiver machine method further comprises:
applying a filter to the collected data such that the portion of the collected data defines portions of a packet that are dissected and protected.

* * * * *